United States Patent [19]

Kobata et al.

[11] Patent Number: 4,713,802

[45] Date of Patent: Dec. 15, 1987

[54] DIGITAL SIGNAL REPRODUCING CIRCUIT

[75] Inventors: Hiroshi Kobata; Tadashi Kojima, both of Yokohama, Japan

[73] Assignee: Kabushiki Kaisha Toshiba, Kawasaki, Japan

[21] Appl. No.: 846,208

[22] Filed: Mar. 31, 1986

[30] Foreign Application Priority Data

| Mar. 30, 1985 | [JP] | Japan | 60-66891 |
| Mar. 30, 1985 | [JP] | Japan | 60-66893 |
| Mar. 30, 1985 | [JP] | Japan | 60-66890 |

[51] Int. Cl.$^4$ ............................ G11B 5/76; G11B 5/09
[52] U.S. Cl. ......................................... 369/59; 360/51
[58] Field of Search ................... 369/59, 48; 360/51; 375/33

[56] References Cited

U.S. PATENT DOCUMENTS

| 4,495,474 | 1/1985 | Nishikawa et al. | 333/11 |
| 4,504,960 | 3/1985 | Yamada | 375/94 |
| 4,583,211 | 4/1986 | Nishikawa et al. | 369/59 |

FOREIGN PATENT DOCUMENTS

| 0096106 | 12/1983 | European Pat. Off. . |
| 0098349 | 1/1984 | European Pat. Off. . |
| 2509890 | 7/1982 | France . |
| 2109293 | 5/1983 | United Kingdom . |

*Primary Examiner*—Vincent P. Canney
*Attorney, Agent, or Firm*—Oblon, Fisher, Spivak, McClelland, & Maier

[57] ABSTRACT

A digital signal reproducing circuit for correcting phase errors of digital signals, and for synchronizing a bit synchronizing clock to the digital signal, including at least a PLL circuit connected to a wave-shaping circuit, a pattern detector connected to the PLL circuit for detecting the specified signal patterns of the digital signal, and a circuit for detecting the phase errors of the inputted digital signals and correcting properly the digital signals after the specified signal pattern are detected by the pattern detector.

22 Claims, 20 Drawing Figures

DIGITAL SIGNAL REPRODUCING CIRCUIT

BACKGROUND OF THE INVENTION

Field of the Invention

This invention relates to a digital signal reproducing circuit that is applicable to digital audio disc playback systems, tape-record information playback systems, digital data processing systems, etc., and more particularly, it relates to a circuit for reproducing digital signals, which are encoded according to a predetermined format for a minimum or maximum pulse inversion period, and clock signals from the reproduced or received digital signals.

In recent years, the digital signal reproducing circuit has been used in a variety of digital systems. In such digital systems, the digital signals are modulated, recorded or transmitted by a variety of digital modulation systems. Digital signals modulated by these digital modulation systems are predetermined without failure by their digital modulation systems for a minimum inversion period and maximum inversion period format. A circuit to reproduce correct data and a clock signal from these modulated digital signals includes a data slice section, a phase synchronization loop circuit section and a digital signal reproducing section.

This phase synchronization loop circuit section reproduces the clock signal (PLCK), and the digital signal reproducing section reads out the digital signal from the input digital signal, using this clock signal (PLCK). Below, as an example, the digital signal reproducing circuit will be explained in the context of being used in digital audio disc players.

In the optical disc 11 in FIG. 1 a digital EMF modulated signal, which is from of digital modulation, is recorded. From this optical disc 11 the signal (RF) is read out using a pickup. This signal (RF) is made binary by the wave-shaping circuit 13, and the clock signal (PLCK) and digital signal (DOUT) EFM modulated are reproduced from this binary signal (DRF) by means of the PLL circuit section 14 and digital signal reproducing section 14. Both the clock signal (PLCK) and digital signal (DOUT) are synchronized, and fed to the demodulation circuit, not illustrated.

In FIG. 1, as the signal (RF) read out by the pickup 12 passes through the finite band line, the signal DC level varies in the form of signal drop-out due to flaws; in the optical disc 11 and the low pass component of the signal itself. A similar effect is experienced in a digital data processing system, because the digital data passes through a frequency non-linear area in the system.

The wave-shaping circuit 13 converts this RF signal into the binary signal (DRF). As an example of this wave-shaping circuit there are U.S. Ser. No. 300,604 which issued as U.S. Pat. No. 4,574,206. In addition to these, a variety of wave-shaping circuits are known. However, it is difficult to set in an optimum way the DC reference voltage to produce the binary signal used in this circuit. In case the RF signal is compared with the DC reference voltage that is not the optimum value, the error between the optimum DC reference voltage and the actual DC reference is converted into a phase error. In FIG. 2 is shown the phase relation among binary signals DRF-a, DRF-b and DRF-c obtained when the DC reference voltage varies as a, b and c. The waveform DRF-a indicates the output waveform when the actual DC reference voltage becomes higher than the optimum DC reference voltage. In this output waveform (DRF-a), the leading edge is delayed, and the trailing edge is advanced.

The delay and advance of this leading edge do not exert a bad influence upon the PLCK in the PLL circuit section. Because this delay and advance are erased, the phase error signal to control VCO is not generated. However, there is a defect that there is not sufficient phase margin. In case the actual DC reference voltage is the optimum DC reference voltage (DRF-b), the phases are in order at the trailing edge of PLCK and at the leading edge of DRF-b, and DRF-b is read out at the later leading edge of PLCK. In this state, it is known that the maximum permissible phase margin is of $\pm \pi$. On the one hand, in the state of DRF-c, the phase margin of one side only has $\pi/2$, and in case even if the phase error of more than $\pi/2$ is produced, a bad influence is exerted upon the reproduction of PLCK.

SUMMARY OF THE INVENTION

An object of the present invention is to provide a digital signal reproducing circuit which can be stably used even with variations in the phase of input signal.

Another object of the present invention is to provide a circuit to reproduce the clock signal and digital signal, without exerting an influence of phase error generated by an amplitude variation of the input signal or a variation in the DC reference voltage of the wave-shaping circuit.

Further, yet another object of the present invention, is to detect and correct any phase errors in the digital signal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
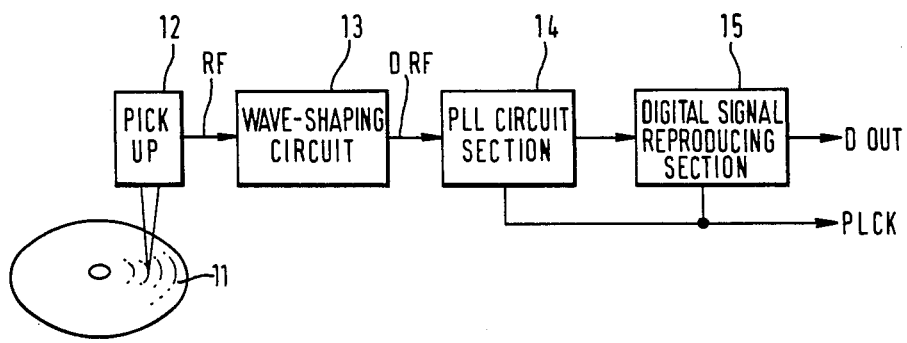
FIG. 1 is a block diagram a conventional digital signal reproducing circuit.
Figure 2:
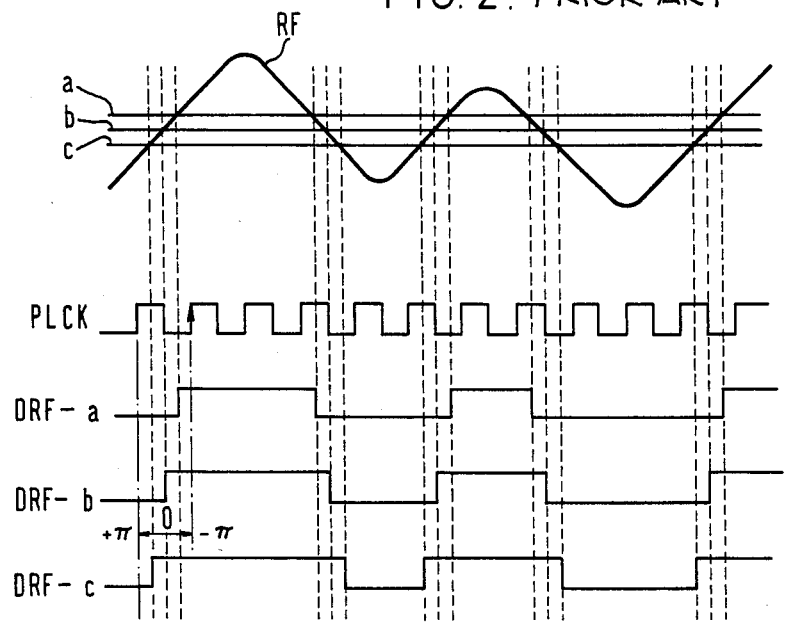
FIG. 2 is a waveform diagram provided for explanation of operation of the circuit of FIG. 1.
Figure 3:
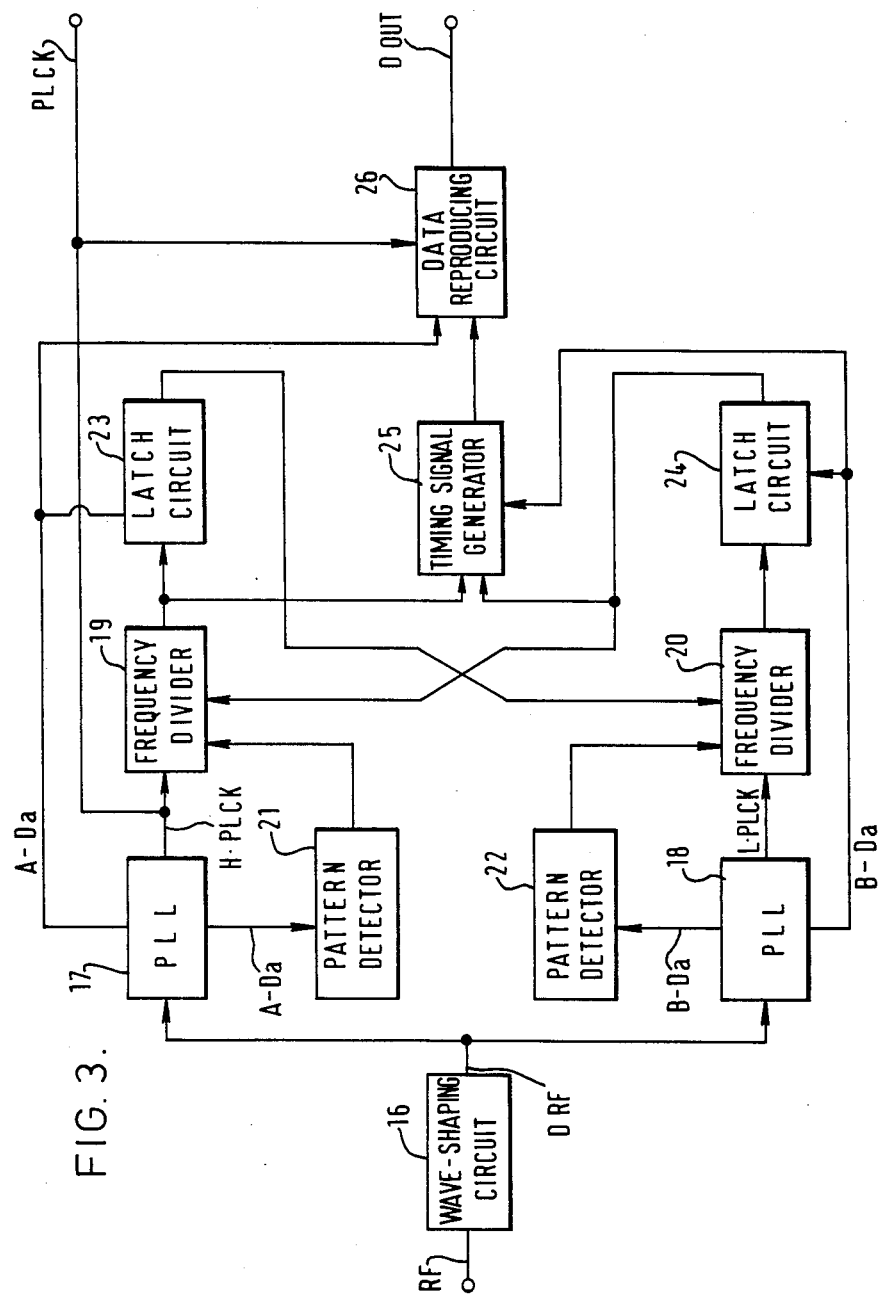
FIG. 3 is a block diagram of first embodiment of the present invention.

Various other objects, features and attendant advantages of the present invention will be more fully appreciated as the same become better understood from the following detailed description when considered in connection with the accompanying drawings in which like reference characters designate like or corresponding parts throughout the several views and wherein FIG. 3 shows a digital signal reproducing circuit according to a first embodiment of the present invention. To a wave-shaping circuit 16, signals (RF) containing the EFM modulated digital signal are applied. This waveshaping circuit 16 makes signals (RF) inputted binary. These binary signals (DRF) are fed to the phase locked loop circuits (PLL) 17 and 18. PLL 17 produces a first bit synchronizing clock (H.PLCK) phase synchronized at the leading edge of binary signal (DRF). Further, the PLL 17 produces a data signal A-Da to detect the leading edge of binary signal from the binary signal (DRF) and first bit synchronizing clock (H.PLCK). On the one hand, the PLL 18 produces the second bit synchronizing clock (L.PLCK) phase synchronized at the trailing edge of binary signal (DRF). Further, this PLL 18 produces the trailing edge detecting data signal from the binary signal (RDF) and second bit synchronizing clock (L.PLCK). The first and second bit synchronizing clocks are fed to the frequency dividers 19 and 20, respectively. The data signals A−Da and B−Da are fed to the pattern detectors 21 and 22, respectively. The frequency dividers 19 and 20 divide by four the bit synchronizing clock. The output of these frequency dividers 19 and 20 is fed to the synchronizing circuits 23 and 24, respectively. The pattern detectors 21 and 22 detect the timing at which the binary signal (DRF) has a pattern of 2 times of the minimum inversion period or that of 2 times of the maximum inversion period. In the EFM modulation that is one of possible digital modulation techniques, the minimum inversion period of the modulated digital signal is 3T, and the maximum inversion period is 11T. Here, T is one cycle of bit synchronizing clock. The synchronizing circuits 23 and 24 delay the output signal of frequency dividers 19 and 20, respectively. The output signal of synchronizing circuit 23 is fed to the frequency divider 20, and the output signal of synchronizing circuit 24 to the frequency divider 19. After detection of the patterns specified by means of the pattern detectors 21 and 22, the frequency dividers 19 and 20 are synchronized. The output signals of fequency divider 19 and of synchronizing circuit 24 are fed to the timing signal generator 25. The output signal of this timing signal generator 25 and the data signals A-Da and H.PLCK outputted from the PLL 17 are fed to the data processor 26. This data processor 26 produces digital signals (DOUT) without phase error from these input signals.

Figure 4:
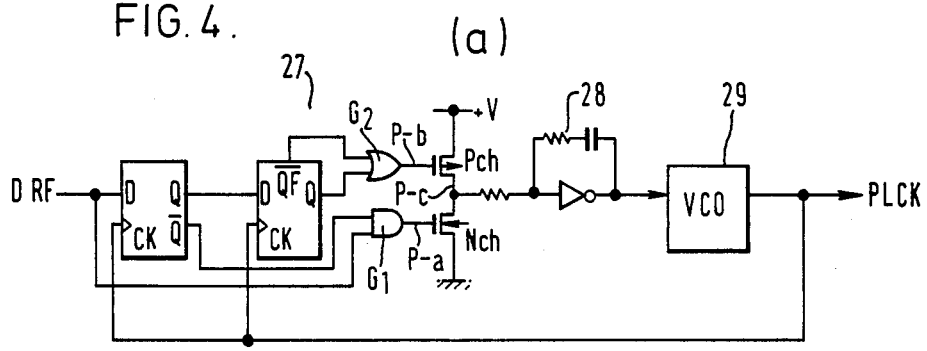
FIGS. 4a and 4b are circuit diagrams of a phase locked loop circuit included in the block diagram shown in FIG. 3.
Figure 4:
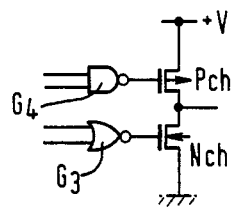

FIG. 4(a) shows the detailed circuit diagram of PLL 17 in FIG. 3. This PLL 17 is composed of a phase comparator 27 to phase compare the binary signal (DRF) and the bit synchronizing clock PLCK, a low pass filter 28 and a VCO 29. This phase comparator 27 is composed of D type flip-flops 28 and 29, an AND gate 30, an OR gate 31, a P channel MOS FET and an N channel MOS FET, and outputs the leading edge of binary signal (RDF) and the phase error signal (P−c) of bit synchronizing clock (PLCK). This phase error signal (P−c) is fed to the VCO 29 through the low pass filter 28. This VCO 19 changes the oscillator frequency of the VCO 19 according to the output of low pass filter 28, and outputs the bit synchronizing clock (PLCK). This PLL 17 produces first phase error components of binary signal (DRF) and bit synchronizing clock (PLCK). The proper phase error is an error detected at the trailing edge of time of the bit synchronizing clock. However, since the reading of binary signal (DRF) is carried out at the rising edge of bit synchronizing clock (PLCK), the phase difference (P−a) is produced first at the leading edge of binary signal (DRF) and bit synchronizing clock.

This phase difference signal (P−a) contains offset components, because the phase difference detection is carried out at the leading edge of bit synchronizing clock (PLCK).

Therefore, the $P-b(\frac{1}{2}T=+\pi)$ that is an offset component is synthesized to the phase difference (P−a), and the phase difference signal (P−c) is obtained. After integrating this phase difference signal (P−c) for a fixed time, the proper phase error signal is outputted, and the proper phase difference signal is produced. The operation of such a PLL 1T can be understood well by the waveform diagram in FIG. 5. Moreover, the PLL 18 in FIG. 3 is a circuit to substitute for the AND gate and OR gate of the PLL 17 shown in FIG. 4(a) as shown in FIG. 4(b).

Figure 6:
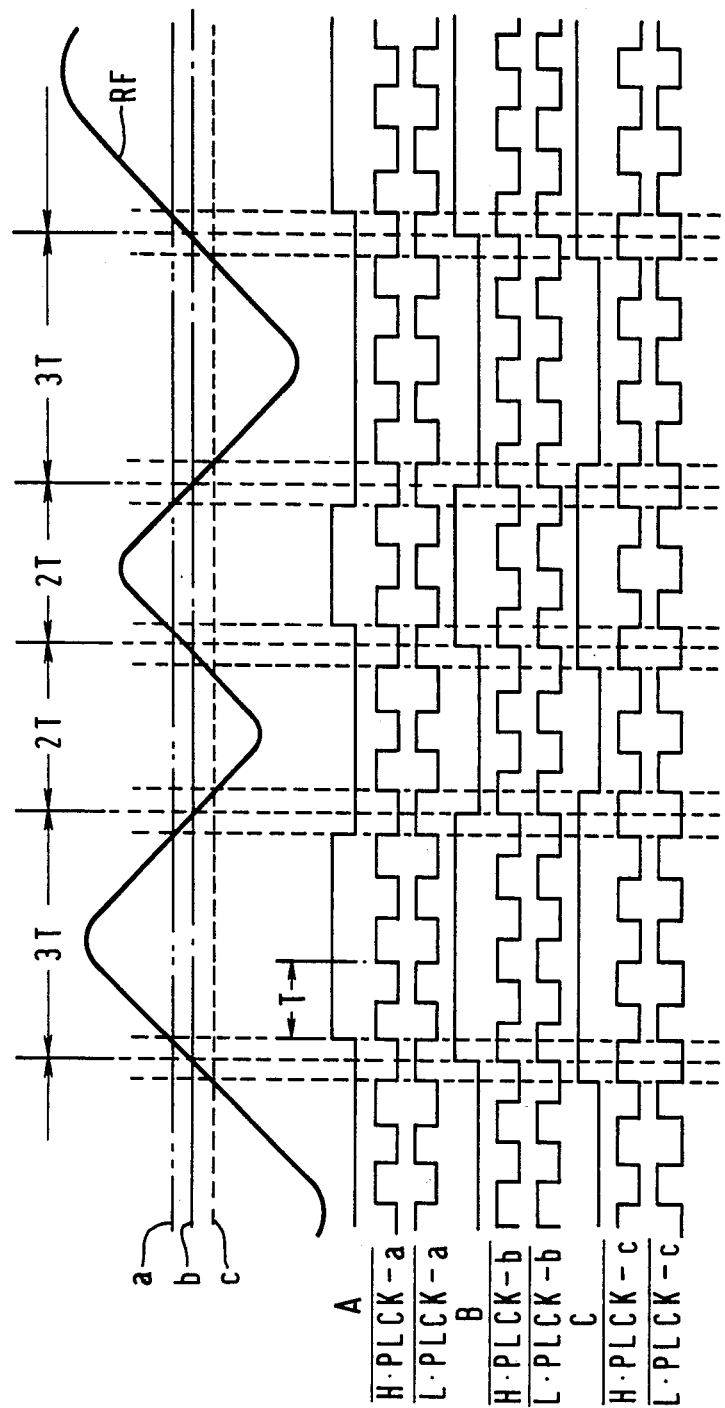
FIG. 6 is a waveform diagram provided for explanation on operation of the present invention.

FIG. 6 shows the binary signal (DRF) and bit synchronizing clocks (H.PLCK and L.PLCK) in case the DC reference voltage of wave-shaping circuit varies as levels a, b and c. In case the DC reference voltage has the level-a, the leading edge of binary signal (DRF) 1s is delayed $\frac{1}{4}$T. As a result, the phase difference of 2 bit synchronizing clock (H.PLCK and L.PLCL) produced in the PLL 17 and 18 is $\frac{1}{2}$T. That is to say, the phase difference of 2 times of the phase error of binary signal (DRF) is generated. Since the proper digital signal generation is impossible as it is, in the first embodiment, the pattern detector, latch circuit and timing signal generator are utilized.

Figure 7:
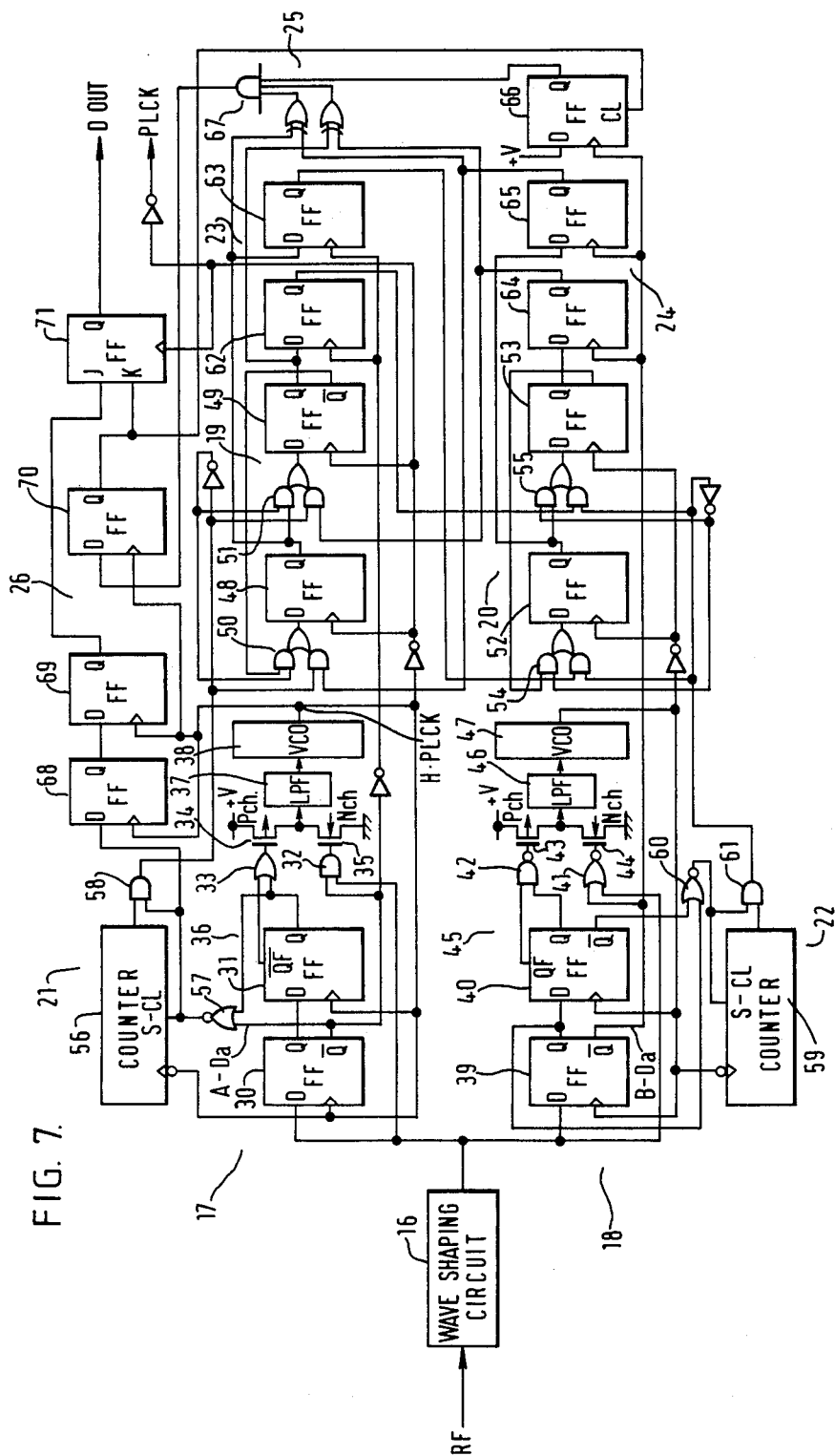
FIG. 7 is a detailed circuit diagram of the first embodiment shown in FIG. 3.

FIG. 7 shows a detailed circuit diagram for reproducing the signals of the first embodiment. The PLL 17 is composed of a phase comparator 36 composed of flip-flops 30 and 31, an AND gate 32, an OR gate 33, a P channel MOS gate 34 and an N channel MOS gate 35, a low pass filter 37 and a VCO 38. The PLL 18 is composed of a phase comparator 45 composed of flip-flops 39 and 40, a NOR gate 41, a NAND gate 42, a P channel MOS GATE 43 ans an N channel MOS gate 44, a low pass filter 46 and a VCO 47. The frequency divider 19 is composed of flip-flops 48 and 49 and gate circuits 50 and 51. The frequency divider 20 is composed of flip-flops 52 and 53 and gate circuits 54 and 55. The pattern detector 21 is composed of a counter 56, a NOR gate 57 and an AND gate 58. The pattern detector 22 is composed of a counter 59, a NOR gate and an AND gate 61. The synchronizing circuit 23 is composed of flip-flops 62 and 63, and the synchronizing circuit 24 is composed of flip flops 64 and 65. The timing signal generator 25 is composed of a flip-flop 66 and a gate circuit 67. The data processor 26 is composed of flip-flops 68, 69, 70 and 71.

In this detailed embodiment the synchronization means contains synchronizing circuits 23 and 24 and gate circuits 50, 51, 54 and 55.

Figure 8:
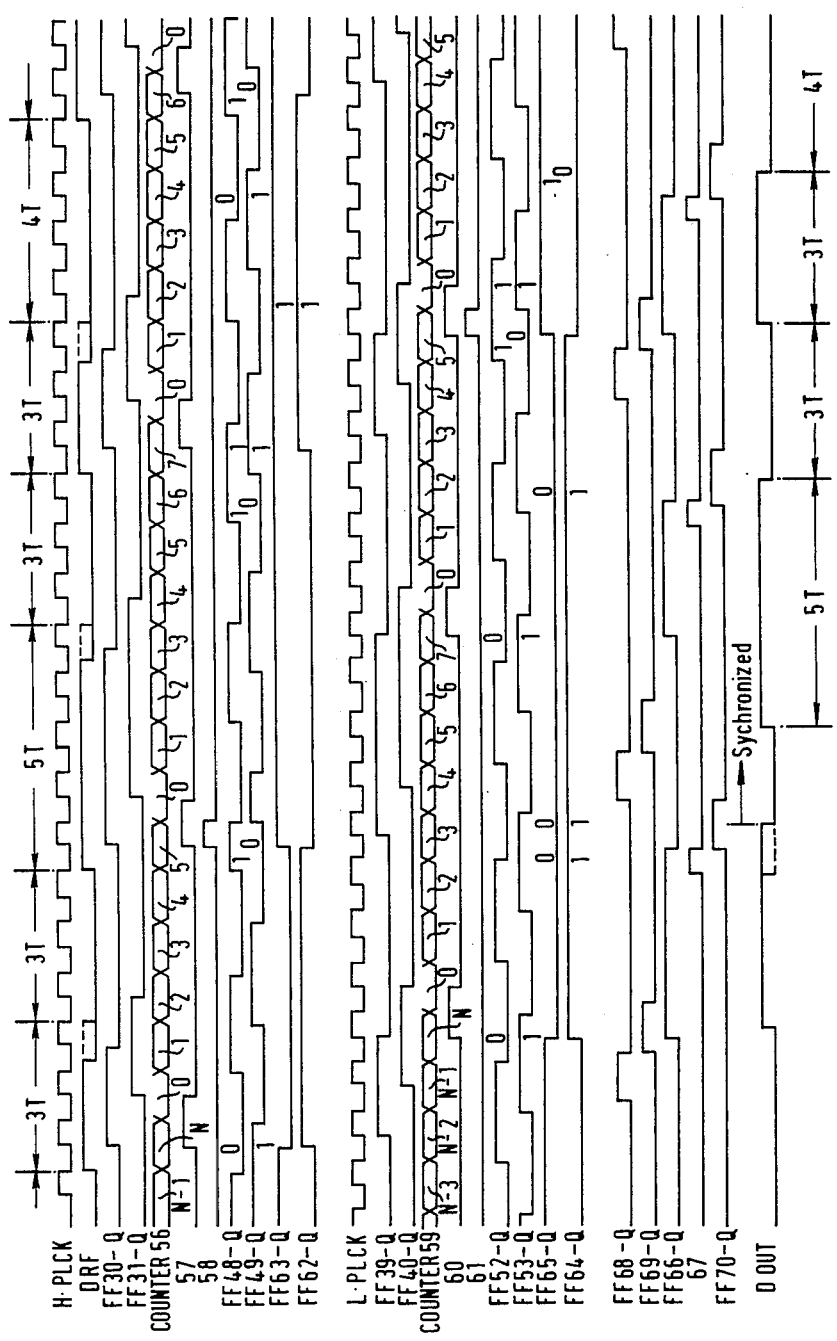
FIGS. 8 and 9 are waveform diagrams provided for explanation of the circuit shown in FIG. 7.
Figure 9:
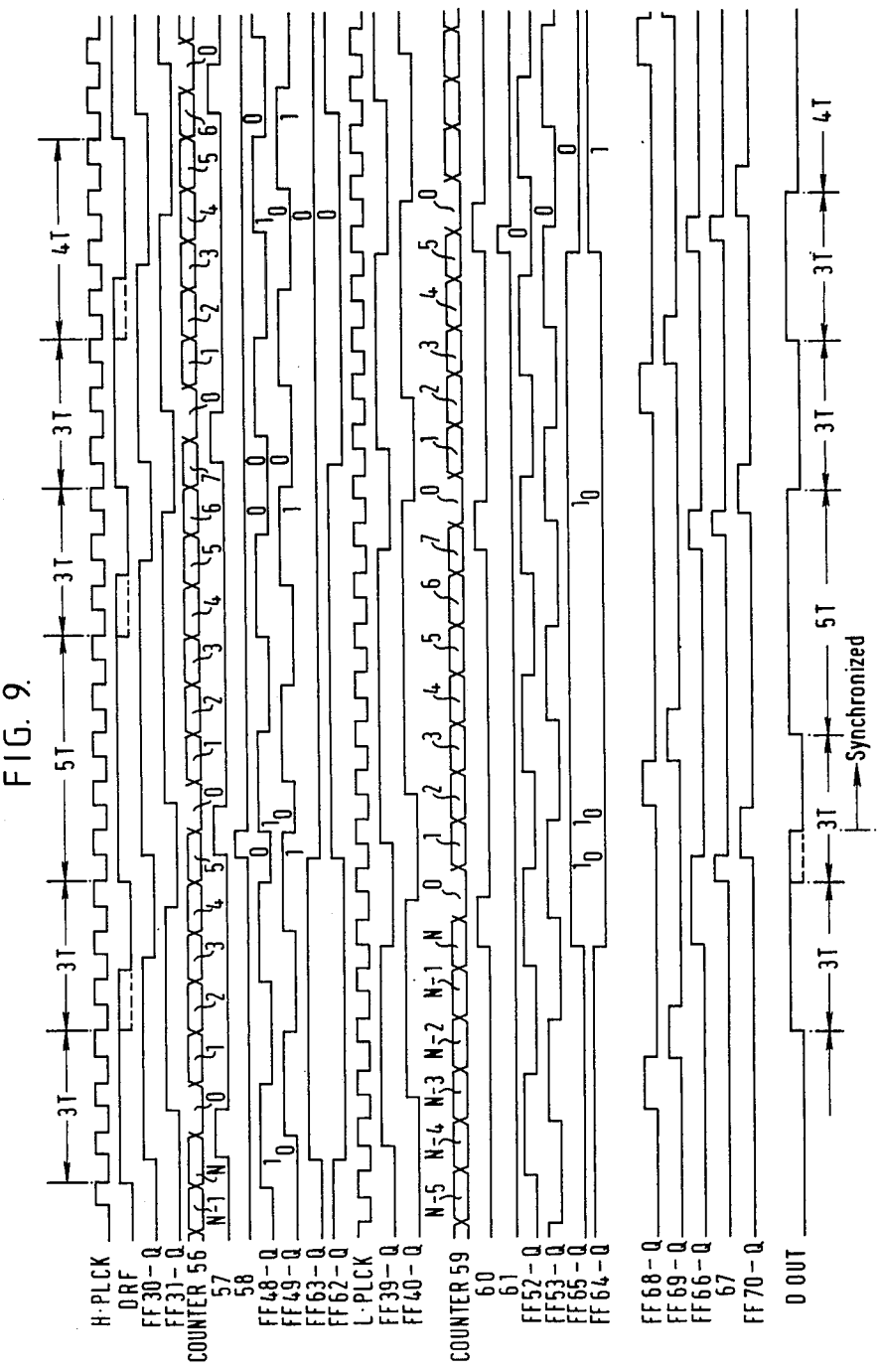

Below the operational explanation of this embodiment is made referring to the waveform diagrams shown in FIGS. 8 and 9. FIG. 8 is a waveform diagram of this circuit in case the DC reference voltage of wave-shaping circuit 16 is high as level a in FIG. 6. FIG. 9 is a waveform diagram of this circuit in case the DC reference voltage of wave-shaping circuit 16 is low as level c in FIG. 6.

Binary signals (DRF) are transmitted to the PLL 17 and PLL 18. In the PLL 17 the bit synchronizing clock (H.PLCK) synchronized to the leading edge of binary signal (DRF) is produced, the Q output of flip-flop 30 and the output of NOR gate 57 that is the NOR signal of Q output of flip-flop 31 are fed to the synchronous clear terminal of counter 56, and as the result this counter 56 is cleared. In the PLL 18 the bit synchronizing clock (L.PLCK) synchronized to the trailing edge of binary signal (DRF) is produced, the Q output of flip-flop 39 and the output of NOR gate 60 that is the NOR signal of Q output of flip-flop 40 are fed to the synchronous clear terminal of counter 59, and as the result this counter 59 is cleared. The pattern detector 21 measures the spacing between leading edges of binary signal (DRF), and the pattern detector 22 measures the spacing between trailing edges of binary signal (DRF). And in case of this embodiment, the counter 56 detects the spacing 6T between leading edges (the T is one cycle of bit synchronizing clock), and the counter 59 detects that the spacing between trailing edges is 6T. This 6T is twice 3T that is the minimum inversion period of EFM modulation, the minimum inversion period being the minimum spacing in a variety of spacing from the leading edge till the trailing edge or from the trailing edge till the leading edge of binary signal (DRF), and the minimum inversional spacing of EFM modulation is of 3T. The fact that 6T is detected by this counter 56 means that the binary signal (DRF) inputs continuously 3T and 3T, and this binary signal (DRF) shall be inverted just at the center of 6T. Because the fact that the spacing between leading edges of the binary signal is T means that the binary signal (DRF) is of 111000, and no other combination other exists. As the minimum inversion period is of 3T, 2T+4T and 5T+1T cannot be found.

The frequency dividers 19 and 20 divide by 4 the H.PLCK and L.PLCK, respectively. The output state of flip-flops 48 and 49 of this frequency divider 19 is latched to the synchronizing circuit 23 at the time of phase comparison timing that is the leading edge of H.PLCX after change of binary signal (DRF). The output state of flip-flops 52 and 53 of frequency divider 20 is latched to the latch circuit at the time of phase comparison timing that is the leading point of time of L. after change of binary signal (DRF). At the time of this state, if the content of counter 56 becomes 5, as well as the output of NOR gate 57 becomes "1", the output of AND gate 58 becomes "1". The output of this AND gate 58 is the output of pattern detector 17. At this time, the content of synchronizing circuit 24 is preset to the frequency divider 19.

Similarly, if the content of counter 59 becomes 5, as well the output of NOR gate 60 becomes "1", the output AND gate 62 becomes "1". At this time, the content of synchronizing circuit 23 is preset to the frequency divider 20. By this operation, both frequency dividers are synchronized. When the spacing between edges in the same direction is of 6T, they are mutually synchronized. The operation of this synchronization will be described more in detail.

The fact that in this circuit the output of AND gate that is the output of pattern detector is generated means that the leading edge of binary signal (DRF) is also inputted at a point of time only before 6T from this time. The modulation system used in this embodiment is EFM modulation, and the minimum inversion period of this modulation system is 3T. Therefore, the trailing edge of binary signal (ZDRF) prior to the point of time that the output of AND gate 58 is generated shall be generated properly 3T before the point of time that the output of AND gate 58 is generated. The fact that the leading edge of this binary signal (DRF) is generated 2T or 4T before the period of time that the output of AND gate 58 is generated is due to the RF signal level variation or the DC reference voltage error. Granted that the trailing edge of binary signal (DRF) is generated as first DRF, shown signal in FIG. 8, approximately 4T before the point of time that the output of AND gate 58 is generated, in a proper way, this trailing edge shall be generated at the center between two leading edges of binary signal (DRF).

The time lag of 1T is generated from the timing of the leading edge of output pulse of AND gate 58 until the data are set in the flip-flops 48 and 49. Therefore, in terms of the data processing, the time spacing between the leading edge generating point of time of the binary signal and the next leading edge seen by the output of frequency divider is 4T.

Since the frequency divider divides by 4 the bit synchronizing clock (1 cycle is 1T), the time difference of 4T is the time of 1 cycle of the frequency divider. Therefore, data of 2 series are synchronized, by setting the data latched to the flip-flops 64 and 65 to the flip-flops 48 and 49 at the trailing edge timing of AND gate 58.

Then, the time base of the digital signal is properly corrected. When the PLL phase compares at the leading edge of DRF, like the circuit of the embodiment shown in FIG. 7, the trailing edge of DRF delays as shown in FIG. 8 or advances as shown in FIG. 9. Therefore, in order to correct the trailing edge till ±2T making the leading edge of DRF as the phase comparison standard, the binary signal (DRF) is delayed 2T, and processed. In case the trailing edge advances against the leading edge, it is enough to simply delay the trailing edge in the portion of phase error, while in case the trailing edge is delayed, this cannot be advanced. Therefore, by delaying the leading edge 2T in advance, even if it is delayed 2T, the data can be corrected. Since the data of frequency dividers 19 and 20 are synchronized, when the Q outputs of flip-flops 52 and 53 is of "1.0", it is set so that each Q output of flip-flops 48 and 49 become "0" and "1", respectively.

Because the leading edge has a delay of 2T, the leading edge output timing is delayed 2T at the point of time that the data of flip-flops 64 and 65 agree with the data of flip-flops 48 and 49. In other words, against the flip-flops 64 and 65, the outputs of flip-flops 48 and 49 are set at the timing delayed two bits. This relation is shown in the following table.

| 65-Q | 64-Q | 48-Q | 49-Q |
|---|---|---|---|
| 0 | 0 | 1 | 1 |

-continued

| 65-Q | 64-Q | 48-Q | 49-Q |
|---|---|---|---|
| 1 | 0 | 0 | 1 |
| 1 | 1 | 0 | 0 |
| 0 | 1 | 1 | 0 |

Then, each Q output of flip-flops 69 and 70 is fed to the flip-flop 71, and the digital signal corrected and made with bit synchronization from the Q of this flip-flop is outputted.

In FIGs. 8 and 9 errors are produced in the first DOUT, because this is the state before being synchronized.

In the embodiment above described the signal made with EFM modulation is used, however, if it is a question of the signal modulated by the digital modulation system that the minimum inversion period or the maximum inversion period is determined, any signal may be convenient. Moreover, the pattern detector in this embodiment may be changed so as to detect 2 times the maximum inversion period.

Concerning the digital signal reproducing circuit above described, its RF signal level variation and the DC reference voltage variation do not exert an influence on the phase comparison range. Furthermore, since the phase error by DC reference voltage variation can be corrected, it is a circuit of extremely high performance. In other words, there is no need to enhance the DC reference voltage regulation capacity in the wave-shaping circuit, and it is possible to perform digital processing by changing the amplitude error of the input signal or of DC reference voltage of wave-shaping circuit to the time base.

Figure 10:
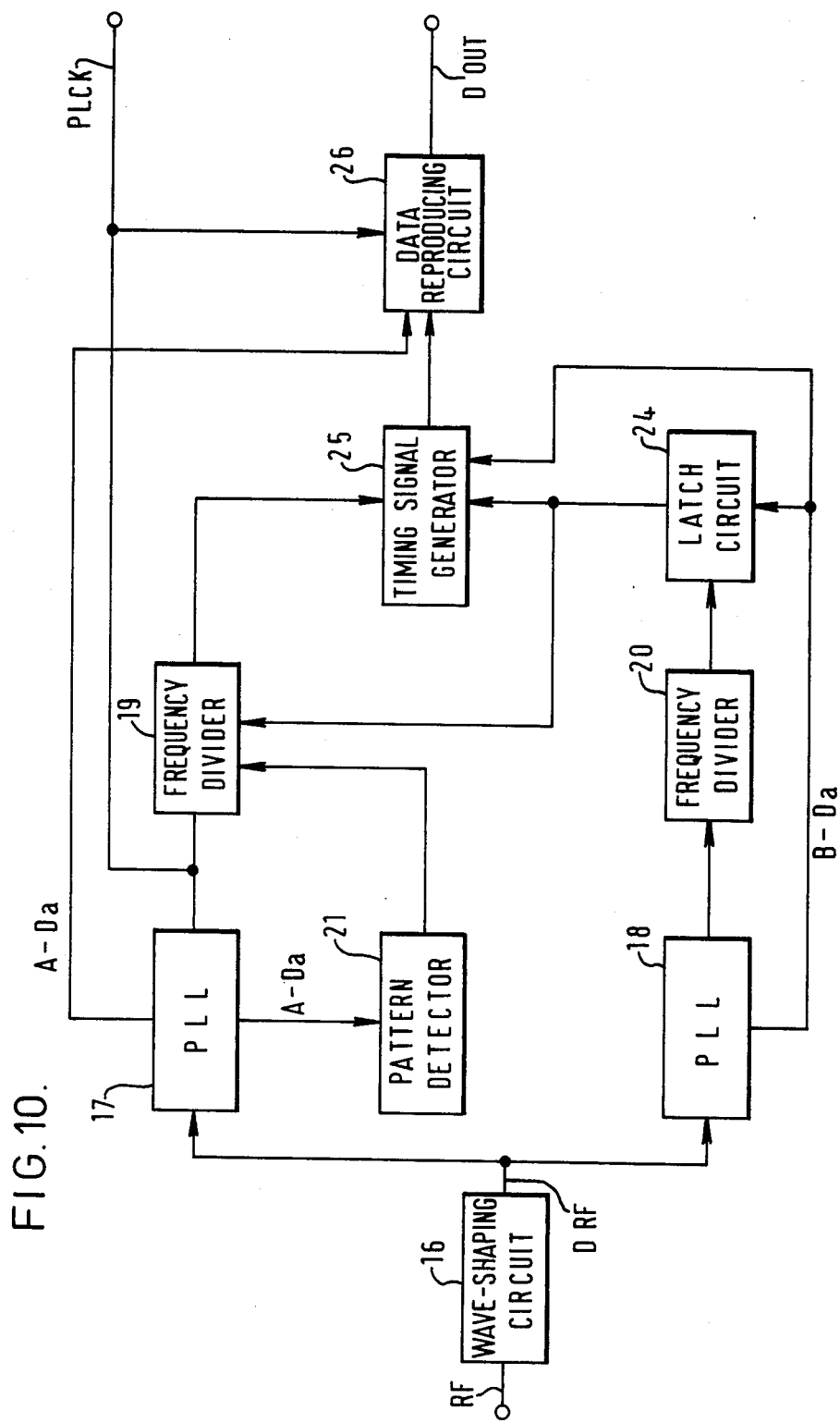
FIG. 10 is a block diagram of a second embodiment of the present invention.
Figure 11:
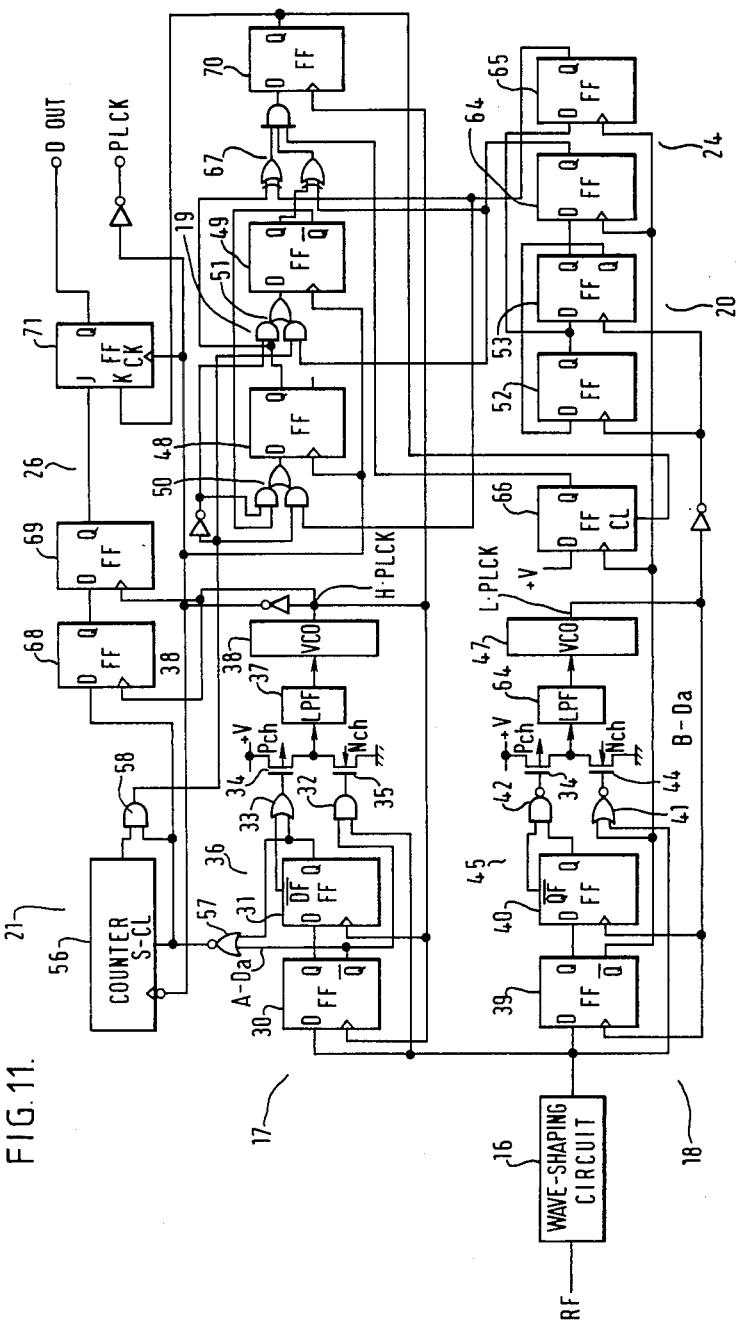
FIG. 11 is a detailed circuit diagram of second embodiment shown in FIG. 10.

FIGS. 10 and 11 show other embodiments of the circuit of the present invention. Most of the elements of this circuit are similar to those found in FIGS. 3 and 7, and accordingly have the same numerical designations. In this circuit binary signals produced by the wave-shaping circuit 16 are fed to the PPL 17 to be phase synchronized at the leading edge and to the PPL to be phase synchronized at the trailing edge. The pattern detector 21 detects that the spacing between leading edges of binary signal is the specified spacing. After the detection signal is obtained by this pattern detector 21, output signals of frequency divider 19 and frequency divider 20 are synchronized. The timing signal generator 25 and the data reproducing circuit 26 detect the phase error in the binary signal, and produce corrected digital signals.

In FIG. 11 the first phase locked circuit is composed of a phase comparator 36, a low pass filter 37 and a VCO 38, and the second phase locked loop circuit is composed of a phase comparator 45, a low pass filter 46 and a VCO 47. The first frequency divider is composed of a flip-flop 48 and a flip-flop 49. The pattern detector circuit is composed of a counter 56, a NOR gate 57 and gate 58. Synchronization is performed by a synchronizing circuit 24, a gate circuit 50 and a gate circuit 51. The timing signal generation circuit is composed of gate circuit 67 and a flip-flop 66, and the data processing circuit is composed of flip-flops 68, 69, 70 and 71.

Figure 12:
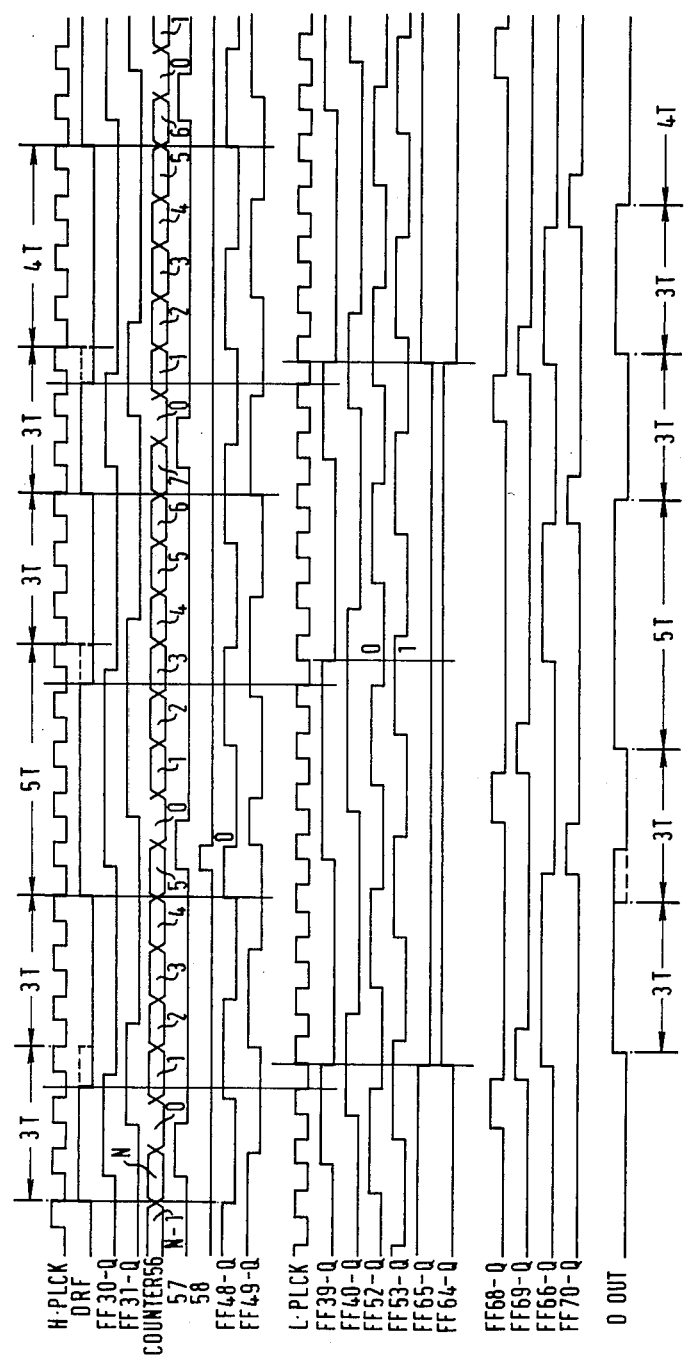
FIGS. 12 and 13 are waveform diagrams provided for explanation of the circuit shown in FIG. 11.
Figure 13:
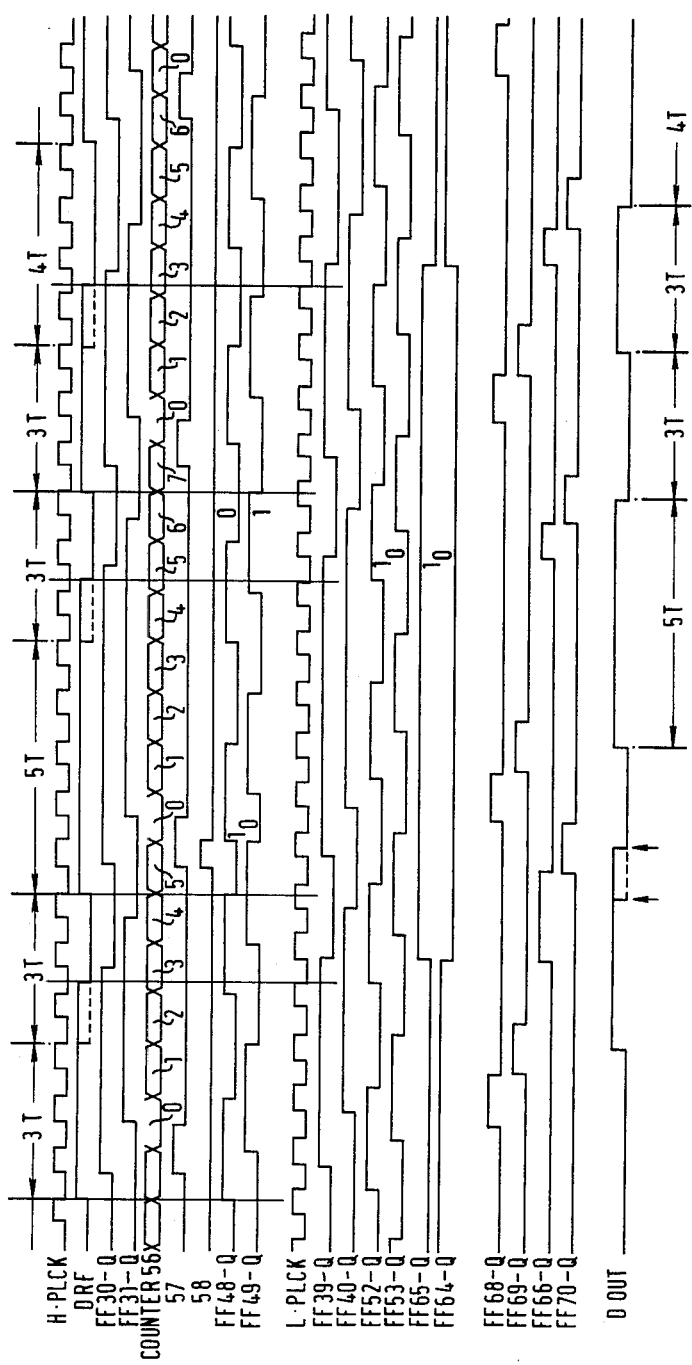

Next, the circuit operation of this second embodiment will be explained referring to FIGS. 11, 12 and 13. FIG. 12 is a waveform diagram of this circuit in case the DC reference voltage of wave-shaping circuit 16 is high as shown by level a in FIG. 6. FIG. 13 is a waveform diagram of this circuit in case the DC reference voltage of wave-shaping circuit 16 is low as shown level c in FIG. 6.

Binary signals (DRF) are fed to the PLL 17 and PLL 18. In the PLL 17 the bit synchronizing clock (H.PLCK) synchronized to the leading edge of binary signal (DRF) is produced, and the output of NOR gate 57 that is the NOR signal of Q output of flip-flop 30 and Q output of flip flop 31 is fed to the synchronous clear terminal of counter 56, and as the result this counter is cleared. The output of this NOR gate 57 contains also the data signal that is the leading edge information of DRF signal. In the PLL 18 the bit synchronizing clock (L.PLCK) synchronized to the trailing edge of binary signal (DRF) is produced. The Q output of flip-flop 39 stands for the data signal that is the trailing edge information of DRF signal, and is fed to the synchronizing circuit 24 and the timing signal generator 25. The pattern detector 21 detects when the spacing between leading edges of binary signal (DRF) is 6T. And the signal indicating that 6T is detected is outputted from the AND gate 58. Two (2) bit synchronizing clocks are divided into 4 by the frequency divider 19 and the frequency divider 20, respectively. Each Q output of flip-flops 52 and 53 in this frequency divider 20 is latched to a latch circuit constituted by flip-flops 64 and 65 in the synchronizing circuit 24 at the phase comparison timing. In this state, when the output of AND gate 58 of pattern detector 21 becomes "1", the data latched to the flip-flops 64 and 65 are preset to the flip-flops 48 and 49. When the output of AND gate 58 becomes "1", it means that the leading edge of binary signal is inputted at the place of time only 6T before this time. Further, the trailing edge of binary signal (DRF) to be corrected shall be generated 3T before the time that the output of AND gate 48 becomes "1". If the timing to preset the latch data of flip-flops 64 and 65 to the flip-flops 48 and 49 is delayed only 1T, the spacing between the trailing edge generation point of time of binary signal and the leading edge expressed in the output of frequency divider coming next becomes 4T. As the time difference of this 4T is the time of 1 cycle of frequency divider, the data of 2 series are synchronized by setting the data latched to the flip-flops 64 and 66 to the flip-flops 48 and 49 at the trailing edge timing of AND gate 58. By this synchronization the timing difference on an actual operation between flip-flops 48 and 49 and flip-flops 64 and 65 corresponds to the phase difference by DC reference voltage level variation.

Also in this embodiment, similar to the first embodiment described above, the phase difference of 2T of binary signal (DRF) can be corrected by delaying the leading edge of binary signal 2T in advance. For this reason, the input timing of the trailing edge is latched. It is enough to make the timing delayed 2T from the timing that the flip-flops 64 and 65 match with the flip-flops 48 and 49 as the timing of the trailing edge of the binary signal.

When the relation between the flip-flops 64 and 65 and the flip-flops 48 and 49 becomes as shown in the following table, the Q output of flip-flop 70 is generated. When making the timing of the pulse center of this flip-flop 70 as the trailing edge of the binary signal, the phase error described above can be corrected.

| 65-Q | 64-Q | 48-Q | 49-Q |
|---|---|---|---|
| 0 | 0 | 1 | 1 |
| 1 | 0 | 0 | 1 |

-continued

| 65-Q | 64-Q | 48-Q | 49-Q |
|------|------|------|------|
| 1 | 1 | 0 | 0 |
| 0 | 1 | 1 | 0 |

FIG. 13 is a waveform diagram illustrating when delaying 1.25T, because the phase of binary signal (DRF) is in error.

Figure 14:
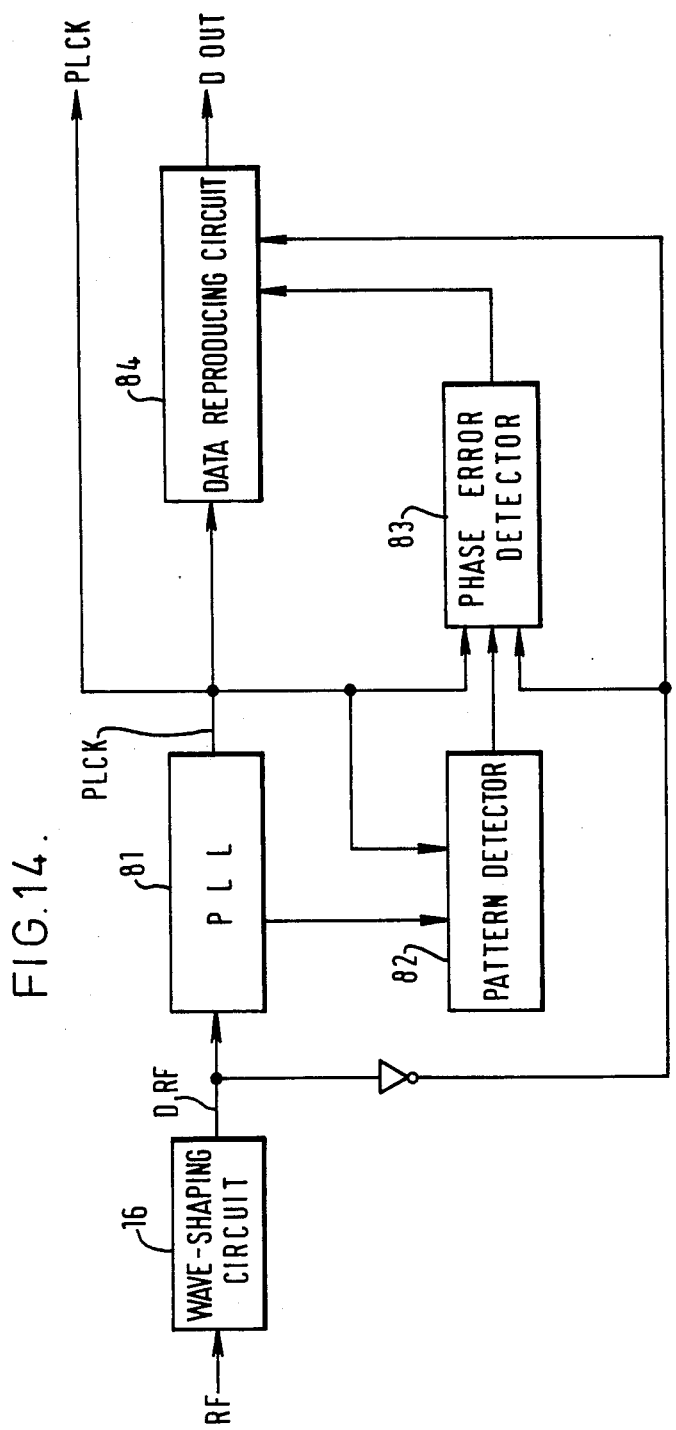
FIG. 14 is a block diagram of third practical example of the present invention.

FIG. 14 is a block diagram of a third embodiment of the present invention. In a wave-shaping circuit 16, the signal (RF) including the EMF modulated digital signal is applied. This wave-shaping circuit 16 converts the signal (RF) into binary form. The binary signal (DRF) is fed to the phase locked loop circuit (PLL) 81. The PLL 81 produces the bit synchronizing clock (PLCK) phase synchronized by the leading edge of binary signal (DRF). Further, the PLL 81 produces the data signal P—a by the binary signal (DRF) and the bit synchronizing clock (PLCX). The pattern detector 82 detects whether there is a signal pattern of twice the minimum inversion period in the binary signal (DRF) or not, and feeds the output signal to the phase error detector 83 when there is this signal pattern. This phase error detector 83 detects a phase error in the binary signal (DRF) that is produced by a DC reference voltage error. This error quantity is fed to the data reproducing circuit 84. The data reproducing circuit 84 corrects the time base of binary signal (DRF) on the basis of the phase error quantity from the phase error detector 83, synchronizes it, and outputs the digital signal.

Figure 15:
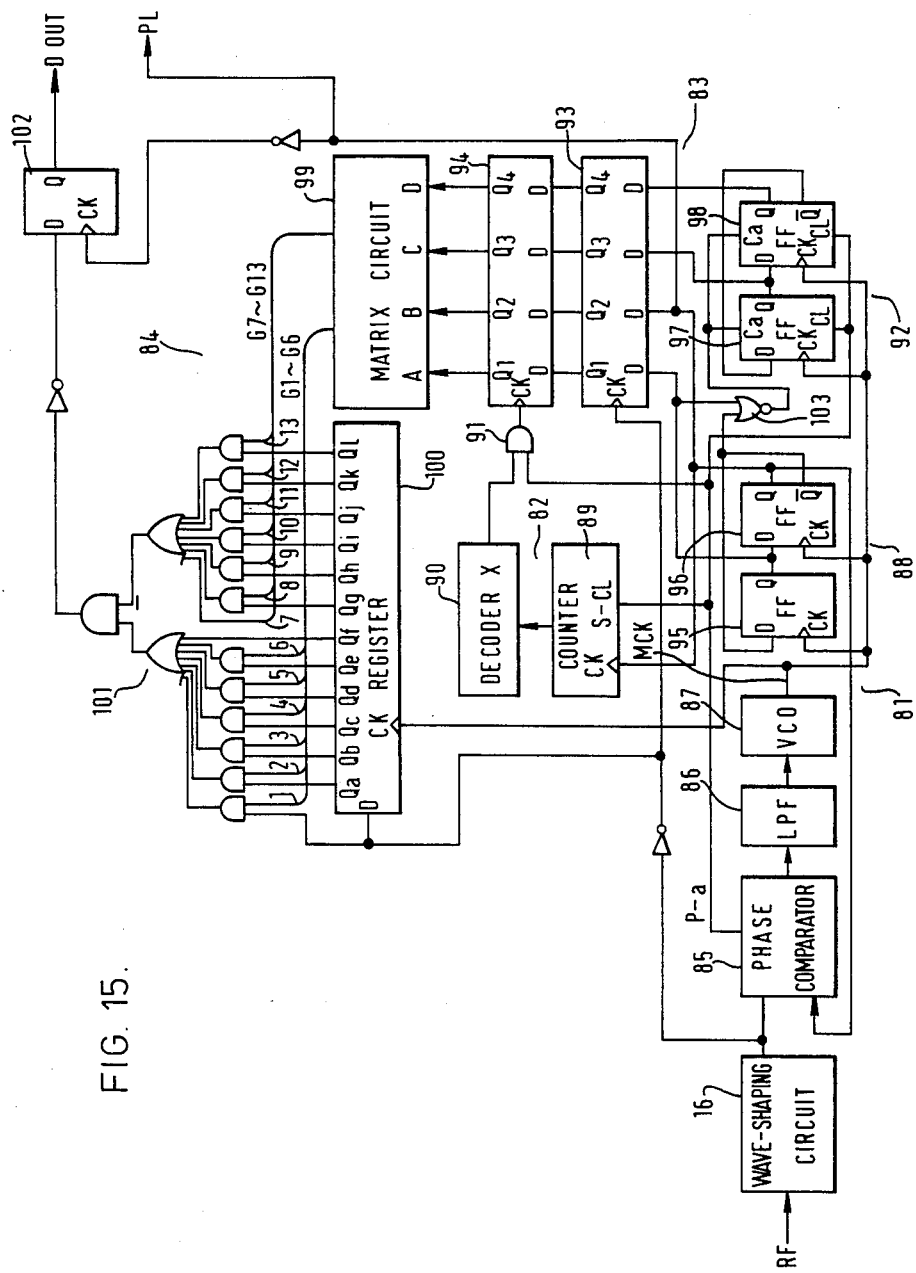
FIG. 15 is a detailed circuit diagram of the third practical example shown in FIG. 4.

FIG. 15 shows a detail circuit diagram of a third embodiment. The PLL 81 is composed of a phase comparator 85, a low pass filter 86, a VCO 87 and a frequency divider 88. The VCO 87 outputs the master clock (MCK) with frequency of 4 times the bit synchronizing clock according to the output of the low pass filter 86. The frequency divider 88 divides by 4 the master clock (MSK), and outputs the bit synchronizing clock (PLCK).

Figure 16:
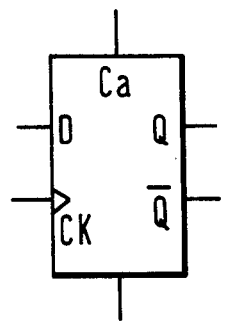
FIG. 16(a) and (b) are schematic illustrations of flip-flop circuits included in the circuit shown in FIG. 15.
Figure 16:
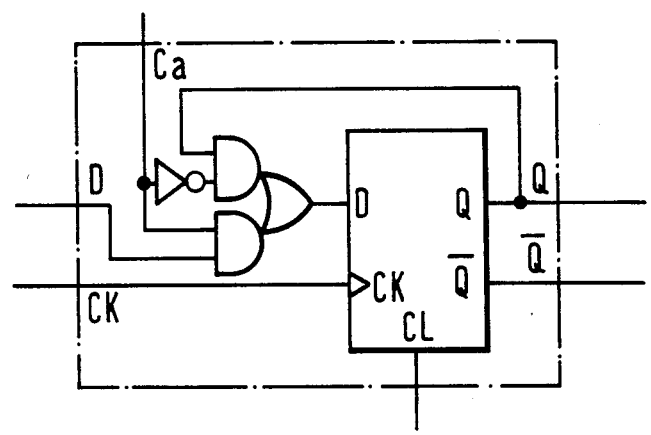
Figure 17:
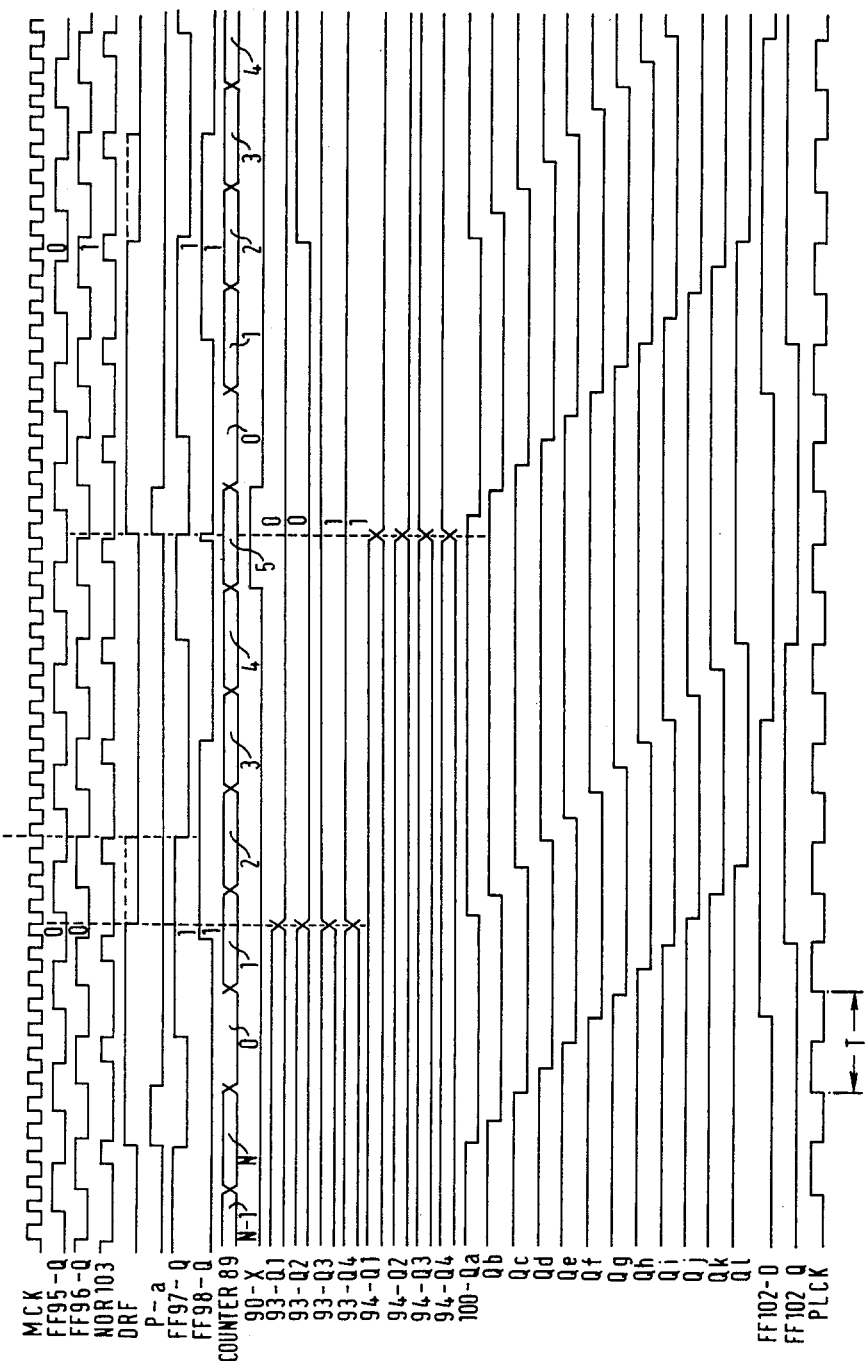
FIG. 17 is a waveform diagram provided for explanation of the circuit shown in FIG. 15.

The pattern detector 82 is composed of a counter 89, a decoder 90 and an AND gate 91. The phase error detector 83 is composed of frequency dividers 88 and 92, registers 93 and 94 and a NOR gate 103. In this circuit, the frequency divider 88 combinedly uses the frequency divider in the PLL 81. The resistor 93 sets each output of flip-flops 95, 96, 97 and 98 at the trailing edge of binary signal (DRF). The register 94 sets the data of register 93 after the spacing between leading edges of binary signal becomes 6T by means of the pattern detector 82. The flip-flops 97 and 98 in this phase error detector 83 are of the circuit configuration shown in FIG. 16.

The data processor 84 is composed of a matrix circuit 99, a register 100, a gate circuit 101 and a flip-flop 102. The relation between the input data and the output data of this matrix circuit 99 is set as shown in the following table. The register 100 and gate circuit 101 convert the binary signal (DRF) into the digital signal corrected, on the basis of the control data outputted from the matrix circuit 99.

Figure 5:
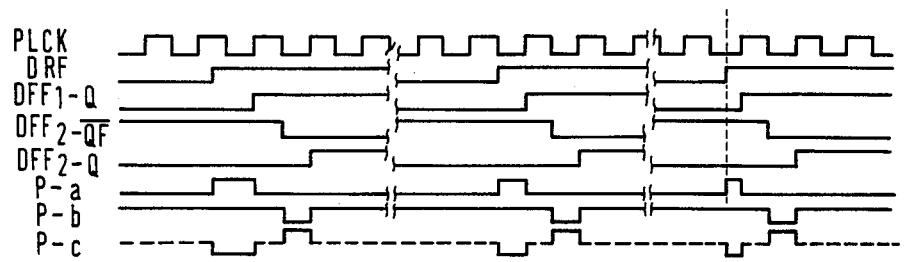
FIG. 5 is a waveform diagram provided for explanation of operation of the phase locked loop circuit of FIGS. 4a and 4b.

The phase comparator 85 outputs the data signal P—a containing the phase difference information from the binary signal (DRF) and bit synchronizing signal. This data signal P—a is shown in FIG. 5. This data signal P—a clears the flip-flops 97 and 98 and counter 89. By the trailing edge of binary signal (DRF) the output data of flip-flops 95, 96, 97 and 98 are set to the register 93.

| | *INPUT* | | | | MATRIX CIRCUIT OUTPUT | | | | | | | | | | | | |
|---|---|---|---|---|---|---|---|---|---|---|---|---|---|---|---|---|---|
| | A | B | C | D | *G1 | G2 | G3 | G4 | G5 | G6 | G7 | G8 | G9 | G10 | G11 | G12 | G13 |
| −6 | 1 | 0 | 1 | 0 | | | | | | | | | | | | | 1 |
| −5 | 1 | 1 | 1 | 0 | | | | | | | | | | | | 1 | |
| −4 | 0 | 1 | 1 | 0 | | | | | | | | | | | 1 | | |
| −3 | 0 | 0 | 1 | 1 | | | | | | | | | | 1 | | | |
| −2 | 1 | 0 | 1 | 1 | | | | | | | | | 1 | 1 | | | |
| −1 | 1 | 1 | 1 | 1 | | | | | | | | 1 | | | | | |
| 0 | 0 | 1 | 1 | 1 | | | | | | | 1 | | | | | | |
| +1 | 0 | 0 | 0 | 1 | | | | | | 1 | 1 | | | | | | |
| +2 | 1 | 0 | 0 | 1 | | | | | 1 | | 1 | | | | | | |
| +3 | 1 | 1 | 0 | 1 | | | | 1 | | | 1 | | | | | | |
| +4 | 0 | 0 | 0 | 1 | | | 1 | | | | 1 | | | | | | |
| +5 | 1 | 0 | 0 | 1 | | 1 | | | | | 1 | | | | | | |
| +6 | 1 | 1 | 0 | 1 | | | 1 | | | | | | | | | | |

After 6T after outputting the leading edge of binary signal (DRF), when the leading edge of binary signal (DRF) is outputted from the wave-shaping circuit 16, the output of decoder 90 becomes "1". When the output data of this decoder 90 and the AND output of data signal P—a become "1", the data stored in the register 93 is set to the register 94. The data set to this register 94 expresses the phase error produced by a DC reference voltage error, described above. That is to say, in case that the spacing between bipolar edges is 6T, the timing the reverse edge shall be generated just at the center (3T). The matrix circuit 99 outputs the data "0011" stored in the register 94 by converting it into the data for control "00000000001000". The gate circuit 101 and the register 100 produce the binary signal (DRF) and the digital signal corrected from the data for control. And this corrected digital signal is synchronized and outputted to the bit synchronizing clock (PLCK) by the flip-flop 102.

The spacing detection value between bipolar edges of binary signal (DRF) in the pattern detector 82 makes it possible to change this embodiment to detect two times the maximum inversion period in the digital signal to be inputted. And, this corrected digital signal corrected is synchronized, and outputted to the bit synchronizing clock (PLCK) by the flip-flop 102.

Figure 18:
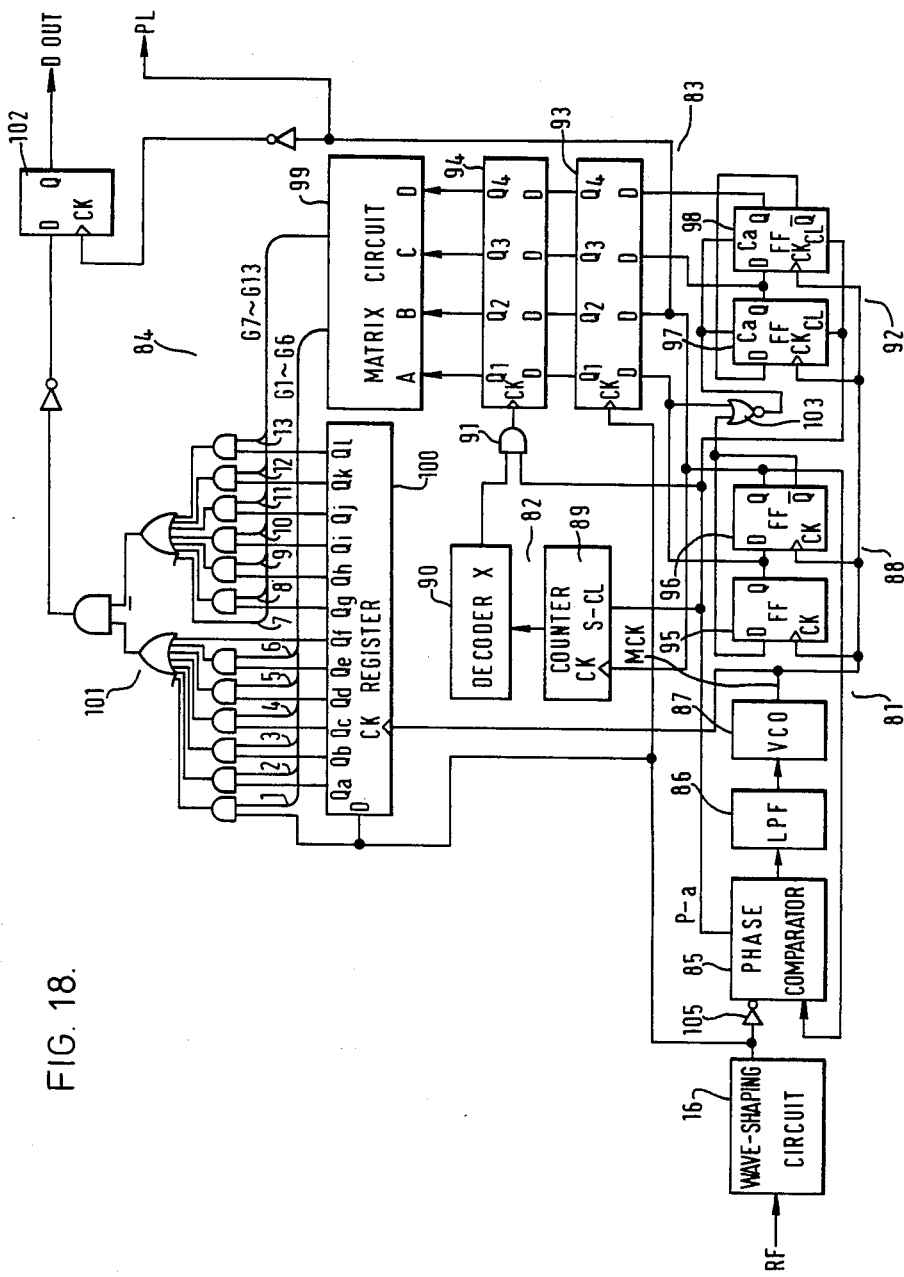
FIG. 18 is a detailed circuit diagram of a modification of the third embodiment shown in FIG. 15.

FIG. 18 shows a modification of the third embodiment which carries out the phase comparison timing of binary signal (DRF) and bit synchronizing signal (PLCK) and the timing of the trailing edge of binary signal (DRF).

The circuit of FIG. 18 is different from the third embodiment as shown in FIG. 15 in that the inverter 104 is removed from the circuit of FIG. 15 and another inverter 105 is placed between the wave-shaping circuit 16 and the phase comparator 85. The rest of the circuit shown in FIG. 18 is the same as the circuit shown in FIG. 15. Therefore it operates identically with the circuit of FIG. 15.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A digital signal reproducing circuit comprising:
   a wave-shaping circuit for converting high-frequency signals comprising digital signals modulated by a predetermined modulation system into binary signals:
   a phase locked loop circuit means for generating a first bit synchronizing clock synchronized in phase to the leading edge of said binary signal and a leading edge detection data synchronized to said first bit synchronizing clock;
   a first and a second frequency divider means for dividing said first and second bit synchronizing clocks, respectively;
   a first and a second pattern detector means for detecting signal patterns specified in said binary signal, respectively;
   a synchronization means for synchronizing the output of said first and second frequency divider means after the signal patterns are detected by said first or second pattern detector;
   a timing signal generation means for detecting the phase difference of each output of said first and second frequency divider means after synchronized by means of said synchronization means and generating timing signals on the basis of the phase difference and said second data signal; and
   data reproducing circuit means for producing digital signals corrected by said timing signals and said first data signal.

2. A circuit as set forth in claim 1, wherein said first and second frequency divider means divide said first and second bit synchronizing clocks by four, respectively.

3. A circuit as set forth in claim 1, wherein said first and second pattern detector means detect signal patterns of two times a minimum inversion period of said binary signal, respectively.

4. A circuit as set for the in claim 1, wherein said first and second pattern detector means detect signal patterns of two times a maximum inversion period of said binary signal, respectively.

5. A circuit as set forth in claim 1, wherein said synchronization means comprises a synchronizing circuit and a gate circuit connected to said first and second frequency divider means.

6. A circuit as set forth in claim 5, wherein said synchronization means has a first synchronizing circuit connected to said first frequency divider means and a second synchronizing circuit connected to said second frequency divider means, the output data of said first synchronizing circuit is preset to said second frequency divider means, and the output data of second synchronizing circuit is preset to said first frequency divider means.

7. A digital signal reproducing circuit comprising:
   a wave-shaping circuit for converting high-frequency signals comprising digital signals modulated by a digital modulation system into binary signals;
   a first phase locked loop circuit means for generating a first bit synchronizing clock synchronized in phase to the leading edge of said binary signal and a leading edge detection data synchronized to said first bit synchronizing clock;
   a second phase locked loop circuit means for generating a second bit synchronizing clock synchronized in phase to the trailing edge of said binary signal and a trailing edge detection data synchronized to said second bit synchronizing clock:
   a first and a second frequency divider means for dividing said first and second bit synchronizing clocks, respectively:
   a pattern detector means for detecting specified signal patterns in said binary signal;
   synchronization means for synchronizing each output of said first and second frequency divider means after the specified signal patterns are detected by said pattern detector means;
   a timing signal generation means for detecting a phase difference of each output of said first and second frequency divider means after being synchronized by said synchronization means and for generating a timing signal on the basis of the phase difference and said second data signal: and
   a data processor means for producing digital signals corrected by said timing signal and said first data signal.

8. A circuit as set forth in claim 7, wherein said first and second frequency divider means divide said first and second bit synchronizing clocks, respectively, by four.

9. A circuit as set forth in claim 7, wherein said pattern detector means detect signal patterns of two times a minimum inversion period of said binary signal, respectively.

10. A circuit as set forth in claim 7, wherein said pattern detector means detects signal patterns of two times a maximum inversion period of said binary signal, respectively.

11. A circuit as set forth in claim 7, wherein said synchronization means comprises a gate circuit connected to said first frequency divider means and a latch circuit connected to said second frequency divider means.

12. A circuit as set forth in claim 11, wherein said synchronization means comprises a synchronization circuit which has an output data present to said first frequency divider means.

13. A digital signal reproducing circuit comprising:
   a wave-shaping circuit for converting high-frequency signals comprising digital signals modulated by a digital modulation system into binary signals;
   a phase locked loop circuit means comprising a phase comparator for comparing in phase said binary signal outputted from said wave-shaping circuit with a bit synchronizing clock at a specified edge timing of said binary signals, an oscillator circuit for generating a master clock on the basis of an output of said phase comparator, and a frequency divider circuit for dividing said master clock and for generating a bit synchronizing clock synchronized with said binary signal;

a pattern detector means for detecting specified signal patterns in said binary signal;

a phase error detecting means comprising a frequency divider and a register, said phase error detecting means outputting a correction signal for correcting said binary signal after the specified signal pattern is detected by said pattern detector means; and a data processing circuit for correcting said binary signal according to said correction signal and for outputting the corrected digital signal in synchronization with said bit synchronizing clock.

14. A circuit as set forth in claim 13, wherein said phase locked loop circuit means further include a phase comparator means for comparing said binary signals with said bit synchronizing signals at the timing of the leading edges of said binary signals.

15. A circuit as set forth in claim 14, wherein said phase locked loop circuit means further include a phase comparator means for comparing said binary signals with said bit synchronizing signals at the timing of the trailing edges of said binary signals.

16. A circuit as set forth in claim 15, wherein said phase error detecting means generate a first phase difference detection signal and a second phase difference detection signal in different phases by dividing said master clock, and further generate a third phase difference detection signal and a fourth phase difference detection signal in different phases by further dividing said first phase difference detection signal, and wherein said register outputs said correction signal after said first, second, third and fourth phase difference detection signals are inputted and the specified patterns are detected by said pattern detector means.

17. A circuit as set forth in claim 16, wherein said phase locked loop circuit means further generate trailing edge detection pulses of said binary signal.

18. A circuit as set forth in claim 13, wherein said phase error detecting means generate a first phase difference detection signal and a second phase difference detection signal in different phases by dividing said master clock, and further generate a third phase difference detection signal and a fourth phase difference detection signal in difference phases by further dividing said first phase difference detection signal, and wherein said register outputs said correction signal after said first, second, third and fourth phase difference detection signals are inputted and the specified patterns are detected by said pattern detector means.

19. A circuit as set forth in claim 14, wherein said pattern detector means detect that a space between leading edges of said binary signal is two times a minimum inversion period.

20. A circuit as set forth in claim 14, wherein said pattern detector means detect that a space between leading edges of said binary signal is two times a maximum inversion period.

21. A circuit as set forth in claim 15, wherein said pattern detector means detect that a space between trailing edges of said binary signal is two times a minimum inversion period.

22. A circuit as set forth in claim 15, wherein said pattern detector means detects that a space between trailing edges of said binary signal is two times a maximum inversion period.

* * * * *